April 1, 1930.  G. R. ENGLEDOW  1,753,112
AIRPLANE
Filed March 27, 1929    2 Sheets-Sheet 1
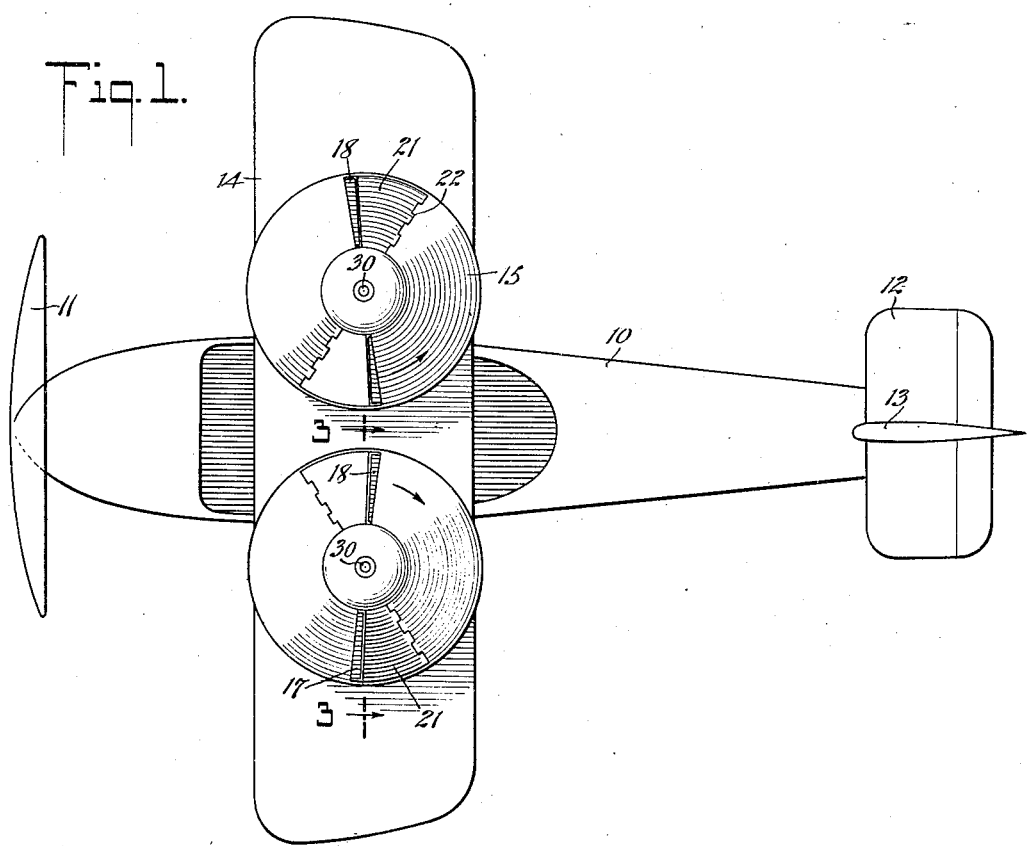
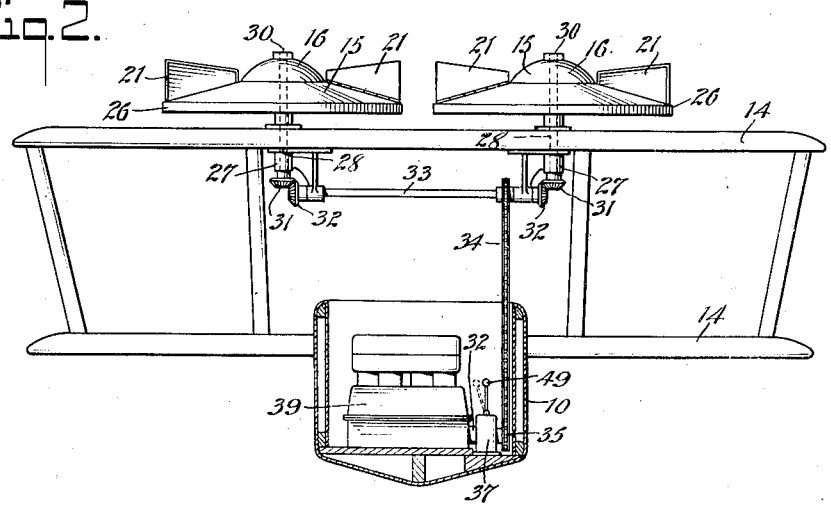
WITNESSES
INVENTOR
G. R. Engledow
BY
ATTORNEYS April 1, 1930.　　　G. R. ENGLEDOW　　　1,753,112
AIRPLANE
Filed March 27, 1929　　2 Sheets-Sheet 2
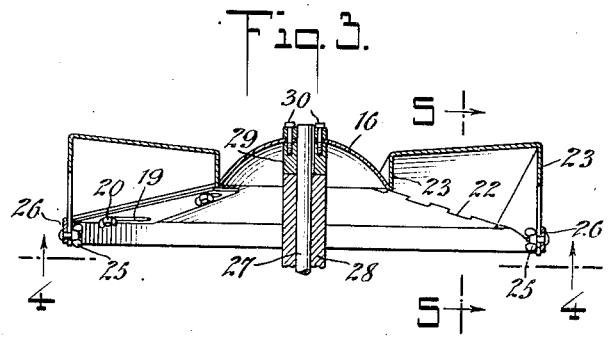
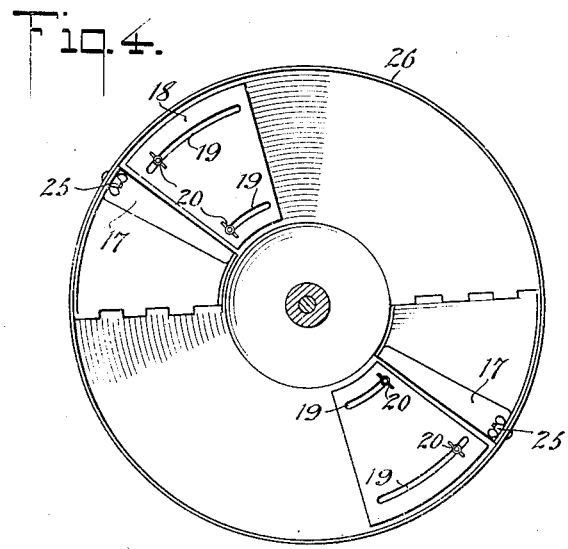
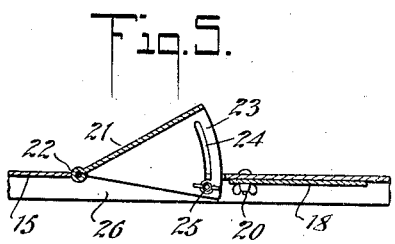
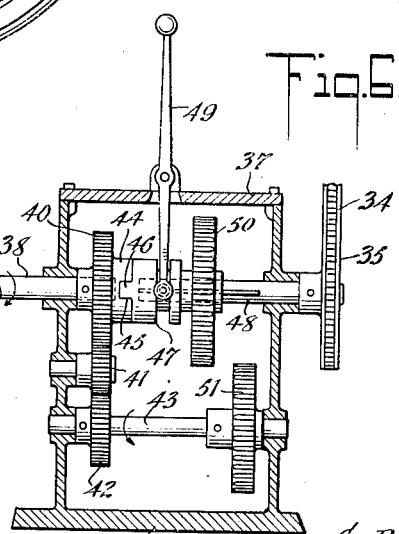
WITNESSES
INVENTOR
G. R. Engledow
BY
ATTORNEYS Patented Apr. 1, 1930

1,753,112

UNITED STATES PATENT OFFICE

GEORGE R. ENGLEDOW, OF RATON, NEW MEXICO

AIRPLANE

Application filed March 27, 1929. Serial No. 350,383.

This invention relates to airplanes.

It is among the objects of the present invention to provide lifting means for an airplane, which operate independently of the lift provided through the normal wing surface of the plane.

Another object of the present invention is to provide a safety and stabilizing device for airplanes which will retard rolling, pitching or slipping of the plane in the air.

A further object of the present invention is to provide in association with an airplane, rotatable members for increasing the lift of the plane and acting as stabilizers and safety devices.

A further object of the invention is to provide in association with an airplane, rotatable members having adjustable deflecting portions in combination with adjustable apertures whereby the effect of rotation of such members may be varied.

A still further object of the invention is to provide in an airplane, rotatable members having central domes adapted to receive air under pressure in a manner acting to increase the lift of the plane and to increase the safety factor thereof.

Other important objects of the invention are to provide reversing means for the revolving members and to provide a simple efficient structure which is readily suited to the demands of economic manufacture.

Numerous other objects and features of the present invention will be apparent from a consideration of the following specification taken in conjunction with the accompanying drawings, in which Figure 1 is a top plan view of one form of my present invention;

Fig. 2 is a front elevation of the device shown in Fig. 1, showing a section through the fuselage;

Fig. 3 is a detail section taken on the line 3—3 of Fig. 1;

Fig. 4 is a detail section on the line 4—4 of Fig. 3;

Fig. 5 is a section on the line 5—5 of Fig. 3, and

Fig. 6 is a detail view of the reversing mechanism.

Referring more particularly to the drawings, it will be understood that the structure herein shown is only one of various forms which the invention may assume. The invention is here disclosed in connection with an airplane including a fuselage 10, front propeller 11, rear elevators 12, rudder 13, and wings 14. It will be understood that the invention is not confined to the specific type of airplane here shown but that it may be applied to any desired type of air vehicle.

The present invention includes the provision of a pair of substantially convex dish-shaped disks 15, which as shown in section in Fig. 3, include a central dome 16 from which the sides extend outwardly and downwardly. Through mechanism hereinafter to be described, it will be observed that the disks are adapted to be revolved over the upper surface of the upper wing 14. The disks 15 are adapted to rotate in a plane parallel to the plane of the wing surface as illustrated.

The sides of the disk 15 adjacent and extending from the dome 16, are provided with apertures 17, the openings of which may be suitably controlled by internal plates 18, which are arcuately slotted as at 19 to provide for the passage therethrough of securing members 20. It will be readily seen that by adjustment of the securing members 20, the plates 18 may be adjusted to control the size of the apertures 17.

For deflecting the air and guiding it under the disk 15, there is provided in association with the apertures 17, hinged deflecting members 21, which are hinged to the disk 15 as at 22 and which include depending side flanges 23 which are adapted to be received through the apertures 17. The adjustment of the angular relation of the deflectors 21 and the disks 15 is provided for by the provision of an arcuate slot 24, through which extends a securing member 25 associated with a vertical depending side flange 26 of the disk. It will be readily seen that adjustment of the deflectors 21 may be accomplished by loosening of the securing member 25 and adjusting its angular relation by movement of the deflector with respect to the disk and to the securing member 25. For rotating the disks 15, the disks are mounted on vertical shafts 27, which extend through suitable bearings 28, in the upper wing 14. The upper end of the shaft 27 preferably carries a bushing 29 which is rotated therewith and to which the dome 16 of the disk 15 is secured by securing members 30.

Associated with the lower end of the shaft 27, there will be seen by referring to Fig. 2, suitable gears 31, which by co-operation with gears 32, carried by a horizontal rotating shaft 33, impart opposite rotation to the disks 15. Rotation of the shaft 33 is provided for by suitable driving connection, as the chain 34, with a sprocket 35 extending from a suitable reversing mechanism. For reversing the rotation of the sprocket 35, reference may be had to Fig. 6, in which a suitable reversing mechanism is provided including a casing 37 to which extends a drive shaft 38, shown in Fig. 2 as associated with a suitable prime mover 39. Within the casing 37, the shaft 38 is provided with a gear 40 which through an intermediate gear 41 turns a gear 42 mounted upon a shaft 43 in a direction the same as the direction of rotation of itself.

It will be understood that it is clearly within the scope of the present invention to replace the chain 34 by suitable rigid driving means such as a shaft or the like. Such changes and modifications of the structural elements here presented are within the scope of the invention and do not avoid the appended claims.

Associated with the gear 40, there is a collar 44 cut out as at 45 to receive tongues 46 carried by a sliding sleeve 47 and keyed to a shaft 48 which extends out from the casing 37 and upon which the sprocket 35 is mounted.

From the foregoing it will be seen that clockwise rotation of the shaft 38 may be imparted directly to the shaft 48 through the connection of the collar 47 with the collar 44. If, however, opposite rotation of the sprocket 35 is required, the collar 47 is moved from the collar 44 by means of the shifting lever 49. The collar 47 has associated with it a gear 50, which when in proper position is adapted to mesh with a gear 51 mounted upon the shaft 43. It will readily be seen that when reverse rotation of the sprocket 35 is desired, the gear 50 is in mesh with the gear 51 and thus the shaft 48 turns oppositely to the direction of rotation of the shaft 38. Thus it will be seen that the direction of rotation of the disks 15 may be controlled through movement of the shifting lever 49.

In the operation of the device in rising from the ground, or during flight of the plane, the disks 15 are rotated by means of their connection with the prime mover 39. rotation of the disks will be seen to act to give the plane a lifting and sustaining factor by means of the deflectors 21, which direct the air under the disks. As hereinbefore explained, the size of the apertures 17 through which the air passes and the angle of deflection of the deflectors 21, may be suitably adjusted to the demands of the airplane. It will be seen that the disks 15 provide a substantially propelling action which forces air thereunder.

By the provision of the central domes 16 in the disks 15 and in conjunction with the depending flanges 26 thereof, the air under the disks is in a state of compression and is received by the domes, thus lending a lifting action to the plane above and beyond the normal lift provided for by the propelling action of the disks.

In the operation of the device, not only are the deflectors adjustable and the apertures 17, but the speed of rotation of the disks and their direction of rotation may be controlled by the speed of rotation of the prime mover and the direction of the rotation of the sprocket 35, as hereinbefore described.

The rotation of the disks opposite to that normally used to provide a lift, may be utilized for long sustained flights, in which case the deflectors of the disks 15 will not engage the air and thus will not retard the speed of the plane. However, the rotation will be seen to provide a positive safety factor not otherwise provided in present-day planes.

From the foregoing it will be seen that the invention provides a novel and reliable lifting and stabilizing means, which is efficient in construction and operation.

It will be understood that numerous changes and modifications in the device and the full use of equivalents may be resorted to without departing from the spirit or scope of the invention as outlined in the appended claims. Such changes and modifications including the driving connection for the disks, and the reversing means therefor, together with structural details of the disk construction.

What is claimed is:

1. A device of the character described, including a rotating apertured disk, deflector means associated adjacent the apertures thereof, means for adjusting the size of said apertures, and means for adjusting the angle of said deflector means.

2. In an airplane, a lifting and stabilizing structure including a pair of horizontally positioned rotatable convex disks mounted for rotation above the plane of said airplane, said disks having adjustable deflectors thereon.

3. In an airplane, a lifting and stabilizing structure including a pair of horizontally positioned rotatable convex disks mounted for rotation above the plane of said airplane, said disks having adjustable deflectors thereon and central air-confining domes.

4. In an airplane, a lifting and stabilizing structure including a pair of horizontally positioned rotatable convex disks mounted for rotation above the plane of said airplane, said disks having adjustable deflectors thereon and central air-confining domes in conjunction with depending side flanges.

5. In an airplane, a lifting and stabilizing structure including a pair of horizontally positioned rotatable convex disks mounted for rotation above the plane of said airplane, said disks having adjustable deflectors thereon and central air-confining domes in conjunction with depending side flanges, and means for driving said disks.

6. In an airplane, a lifting and stabilizing structure including a pair of horizontally positioned rotatable convex disks mounted for rotation above the plane of said airplane, said disks having adjustable deflectors thereon and central air-confining domes in conjunction with depending side flanges, means for driving said disks, and means for reversing the direction of rotation thereof.

Dr. GEORGE R. ENGLEDOW.